US011822955B2

(12) United States Patent
Story et al.

(10) Patent No.: US 11,822,955 B2
(45) Date of Patent: *Nov. 21, 2023

(54) SYSTEM AND METHOD FOR DECENTRALIZED VEHICLE SOFTWARE MANAGEMENT

(71) Applicant: STEERING SOLUTIONS IP HOLDING CORPORATION, Saginaw, MI (US)

(72) Inventors: Michael R. Story, Bay, MI (US); Keyur R. Patel, Rochester, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 310 days.

This patent is subject to a terminal disclaimer.

(21) Appl. No.: 16/746,805

(22) Filed: Jan. 17, 2020

(65) Prior Publication Data

US 2021/0224104 A1 Jul. 22, 2021

(51) Int. Cl.
 *G06F 9/48* (2006.01)
 *G06F 9/54* (2006.01)
 *G06F 11/30* (2006.01)
 *G06F 9/50* (2006.01)

(52) U.S. Cl.
 CPC .......... *G06F 9/4843* (2013.01); *G06F 9/5044* (2013.01); *G06F 9/542* (2013.01); *G06F 9/546* (2013.01); *G06F 11/3013* (2013.01)

(58) Field of Classification Search
 None
 See application file for complete search history.

(56) References Cited

U.S. PATENT DOCUMENTS

| | | | |
|---|---|---|---|
| 2005/0283291 A1* | 12/2005 | Whang ................ | B62D 5/0484 180/443 |
| 2007/0094270 A1* | 4/2007 | Gallino ................ | G06F 9/5044 |
| 2008/0007765 A1* | 1/2008 | Ogata ..................... | G06F 9/505 358/1.15 |
| 2013/0111271 A1* | 5/2013 | Baltes ................... | G06F 11/261 714/38.1 |
| 2014/0075197 A1* | 3/2014 | Alrabady ............... | G06F 21/57 713/176 |

(Continued)

OTHER PUBLICATIONS

Wu, Dexiang et al. "A Trust-Aware Task Offloading Framework in Mobile Edge Computing". IEEE Access. (Year: 2019).*

*Primary Examiner* — Adam Lee
(74) *Attorney, Agent, or Firm* — Dickinson Wright PLLC (57) ABSTRACT

A method for dynamic software management includes receiving, at a source processor, an idle time and at least one task execution characteristic of corresponding to respective processors of one or more other processors. The method also includes identifying a target processor of the one or more other processors capable of executing a task associated with the source processor based on the idle time and the at least one task execution characteristic of the target processor. The method also includes communicating, to the target processor, a task request requesting the target processor execute the task associated with the source processor. The method also includes, in response to receiving a communication from the target processor indicating acceptance of the task, communicating, to the target processor, instructions for executing the task.

14 Claims, 6 Drawing Sheets

(56) References Cited

U.S. PATENT DOCUMENTS

| | | | |
|---|---|---|---|
| 2014/0188388 A1* | 7/2014 | Malahy | G01C 21/3446 |
| | | | 701/400 |
| 2015/0007185 A1* | 1/2015 | Dey | G06F 9/4843 |
| | | | 718/102 |
| 2016/0306673 A1* | 10/2016 | You | G06F 9/5038 |
| 2016/0365853 A1* | 12/2016 | Zeabari | H01L 27/0629 |
| 2016/0378443 A1* | 12/2016 | Sun | G06F 8/41 |
| | | | 717/140 |
| 2018/0001887 A1* | 1/2018 | Watanabe | B60W 30/025 |
| 2018/0052698 A1* | 2/2018 | Holler | G06F 9/45533 |
| 2019/0034250 A1* | 1/2019 | Fuchs | G06F 9/546 |
| 2019/0373051 A1* | 12/2019 | Binotto | H04L 67/1012 |
| 2019/0375298 A1* | 12/2019 | Symanow | B60L 50/61 |
| 2020/0195468 A1* | 6/2020 | Kwon | H04L 12/40013 |
| 2020/0211301 A1* | 7/2020 | Zhang | H04L 63/065 |
| 2020/0398671 A1* | 12/2020 | Awad Alla | B60L 58/12 |

\* cited by examiner

FIG. 5

SYSTEM AND METHOD FOR DECENTRALIZED VEHICLE SOFTWARE MANAGEMENT

TECHNICAL FIELD

This disclosure relates to vehicle software management and in particular to systems and methods for dynamic software management.

BACKGROUND

Vehicles, such as cars, trucks, sport utility vehicles, crossovers, mini-vans, or other suitable vehicles, are increasingly providing complex technology that offers operators of such vehicles increased functionality and safety features. For example, such vehicles typically include advanced mirror control, complex engine control, driver assist features (e.g., adaptive cruise control, and the like), complex safety features, and the like.

As the complexity of such technology continues to increase, vehicle mechanical systems are being replaced by complex electronics control units (ECU). Such ECUs are typically programmed with software to perform the desired features of the vehicle. ECUs typically communicate over various networks within such vehicles. In order to provide features, such as those described, vehicles may include an increased number of ECUs, which, accordingly, may be programmed with increasingly complex software. Increased software functionality and complexity may make ECU throughput management challenging.

SUMMARY

This disclosure relates generally to vehicle software management.

An aspect of the disclosed embodiments includes a system for dynamic software management. The system includes a source processor and a memory. The memory includes instructions that, when executed by the source processor, cause the source processor to: receive, from one or more other processors, an idle time and at least one task execution characteristic of corresponding to each respective processor of the one or more other processors; identify a target processor of the one or more other processors capable of executing a task associated with the source processor based on the idle time and the at least one task execution characteristic of the target processor; communicate, to the target processor, a task request requesting the target processor execute the task associated with the source processor; and in response to receiving a communication from the target processor indicating acceptance of the task, communicate, to the target processor, instructions for executing the task.

Another aspect of the disclosed embodiments includes a method for dynamic software management. The method includes receiving, at a source processor, an idle time and at least one task execution characteristic of corresponding to respective processors of one or more other processors. The method also includes identifying a target processor of the one or more other processors capable of executing a task associated with the source processor based on the idle time and the at least one task execution characteristic of the target processor. The method also includes communicating, to the target processor, a task request requesting the target processor execute the task associated with the source processor. The method also includes, in response to receiving a communication from the target processor indicating acceptance of the task, communicating, to the target processor, instructions for executing the task.

Another aspect of the disclosed embodiments includes a dynamic software management apparatus. The apparatus includes a first electronic control unit of a vehicle. The first electronic control unit includes a processor and a memory. The memory includes instructions that, when executed by the processor, cause the processor to: receive, a second electronic control unit of the vehicle, an idle time and at least one task execution characteristic of the second electronic control unit; determine whether the second electronic control unit is capable of executing software associated with the first electronic control unit based on the idle time and the at least one task execution characteristic of the second electronic control unit; in response to a determination that the second electronic control unit is capable of executing the software, communicate, to the second electronic control unit, a request to execute the software; and in response to receiving a communication from the second electronic control unit indicating acceptance of the request to execute the software, flash the software on the second electronic control unit.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, vehicles, such as cars, trucks, sport utility vehicles, crossovers, mini-vans, or other suitable vehicles, are increasingly providing complex technology that offers operators of such vehicles increased functionality and safety features. For example, the automotive software industry has evolved rapidly from few features to more advanced features, such as advanced autonomous features, advanced driver-assistance systems (ADAS), advanced mirror control, complex engine control, driver assist features (e.g., adaptive cruise control, and the like), complex safety features, and the like.

As the complexity of such technology continues to increase, vehicle mechanical systems are being replaced by complex electronics control units (ECU). Such ECUs are typically programmed with software to perform the desired features of the vehicle. ECUs typically communicate over various networks within such vehicles. In order to provide features, such as those described, vehicles may include an increased number of ECUs, which, accordingly, may be programmed with increasingly complex software.

This increase in the number and complexity of such features has created a need for more software complexity such as advance prognostics, fail operations, fail tolerances, higher safety levels, and the like. More software functionality and complexity may create a challenge for ECU and/or software throughput management. Current electronic power steering (EPS) system production projects and/or steer by wire software development may experience such software throughput challenges. Higher throughput (e.g., between 80% and 92% and treading higher) may cause data corruption and ECU reset, which may lead to a catastrophic event.

Typical approaches to address such throughput challenges include: changing a central processing unit (CPU) clock; changing the CPU instruction wait time; optimizing functions related to the software; reducing functionality provided by the software; optimizing function execution (e.g., such that wait time is reduced); and diversifying design approach using a timer, direct memory access (DMA), other peripherals, or a combination thereof, all to reduce wait time. However, such approaches may be trivial to implement technically, may negatively impact performance of such systems.

Accordingly, systems and methods, such as those described herein, that are configured to improve software throughput management, while maintaining hardware performance, may be desirable. In some embodiments, the systems and methods described herein may be configured to dynamically distribute task execution management using various ECUs in a vehicle. As described, the vehicle may include a plurality of ECUs connected by a communication network. The ECUs may be programed to control aspects of respective components of the vehicle and may include corresponding specific functions for the respective components. Some, but not all, of the ECUs may run at a relatively higher throughput. The systems and methods described herein may be configured to take advantage of available (e.g., unused) processing throughput of designated ECUs through use of the communication network. The systems and methods described herein may be configured to build and deploy decentralized applications on the communication network by placing a portion of an application on another ECU in the network.

In some embodiments, the systems and methods described herein may be configured to execute, on at least some of the ECUs, a software throughput management application (management application). The management application may include a task observer and supervisor function, which is configured to record (e.g., store) idle task (e.g., idle time) and software stake information (e.g., software execution capability characteristic) for the ECUs. In some embodiments, the software stakes also include a proof of trust (e.g., indicating that the corresponding ECU is trusted to executed software associated with the software stake) based on operator preselected ECU proofs. In some embodiments, the ECUs may communicate proof of software stake to the communication network and source ECU (e.g., an ECU with software execution to offload to other ECUs to take advantage of idle time) may store recordings indicating available software stakes in the communication network.

In some embodiments, the systems and methods described herein may be configured to generate a request to a remote ECU in response to the source ECU identifying space and execution bandwidth (e.g., idle processor time) for an available software stake in the remote (e.g., target) ECU. The remote ECU may be configured to execute the management application. The management application on the remote ECU may receive the request and agree to execute the functional state from the source ECU. The remote ECU may communicate to a "grant permission" (e.g., acceptance) signal indicating that the remote ECU agrees that the source ECU may have access to the software stake for a limited stake run. The systems and methods described herein may be configured to communicate, from the source ECU to the remote ECU, the software to be executed on the remote ECU in response to the source ECU receiving the grant permission signal.

In some embodiments, the systems and methods described herein may be configured to receive, at a source processor, an idle time and at least one task execution characteristic of corresponding to respective processors of one or more other processors. The systems and methods described herein may be configured to identify a target processor of the one or more other processors capable of executing a task associated with the source processor based on the idle time and the at least one task execution characteristic of the target processor. The systems and methods described herein may be configured to communicate, to the target processor, a task request requesting the target processor execute the task associated with the source processor. The systems and methods described herein may be configured to, in response to receiving a communication from the target processor indicating acceptance of the task, communicate, to the target processor, instructions for executing the task.

Figure 1:
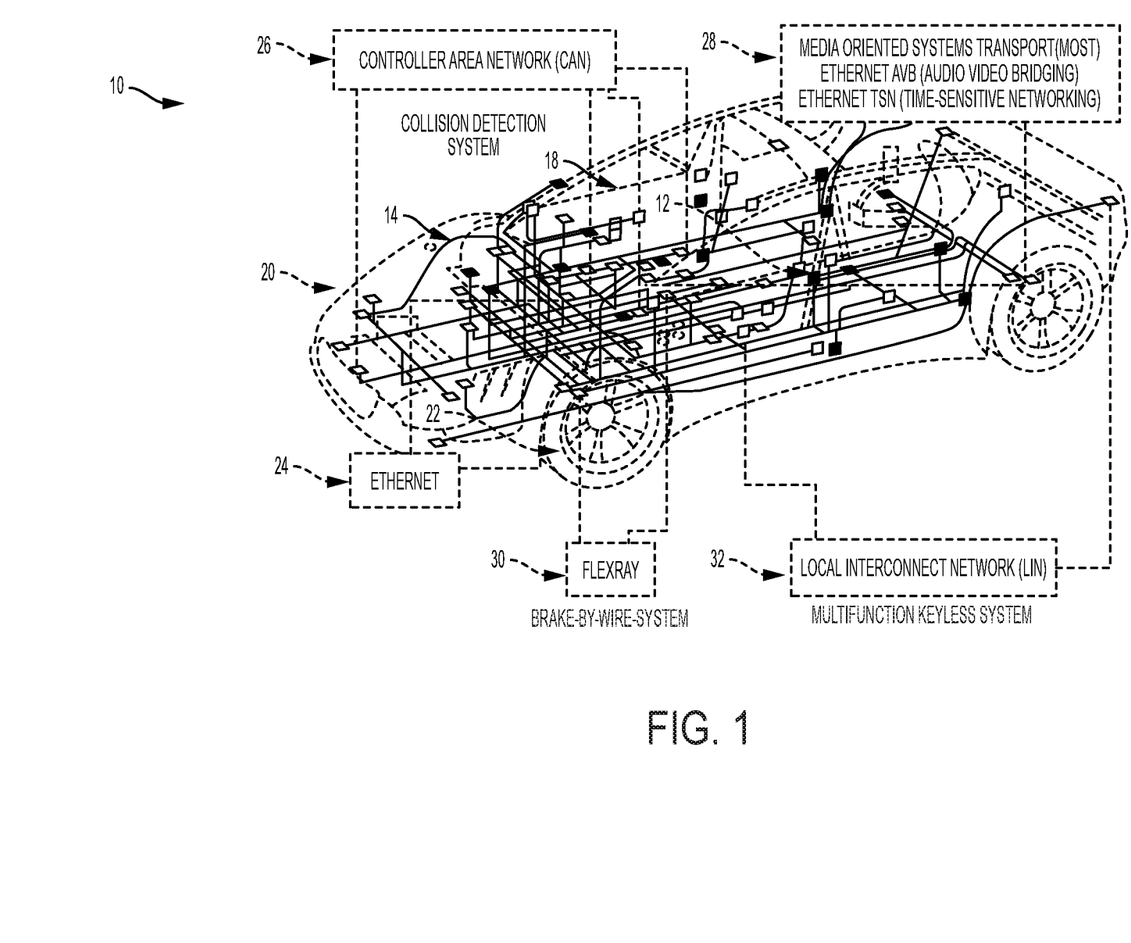
FIG. 1 generally illustrates a vehicle according to the principles of the present disclosure.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles.

The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network component (CAN) 26, a media oriented systems transport component (MOST) 28, a FlexRay component 30 (e.g., brake-by-wire system, and the like), and a local interconnect network component (LIN) 32. The vehicle 10 may use the CAN 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

Figure 2:
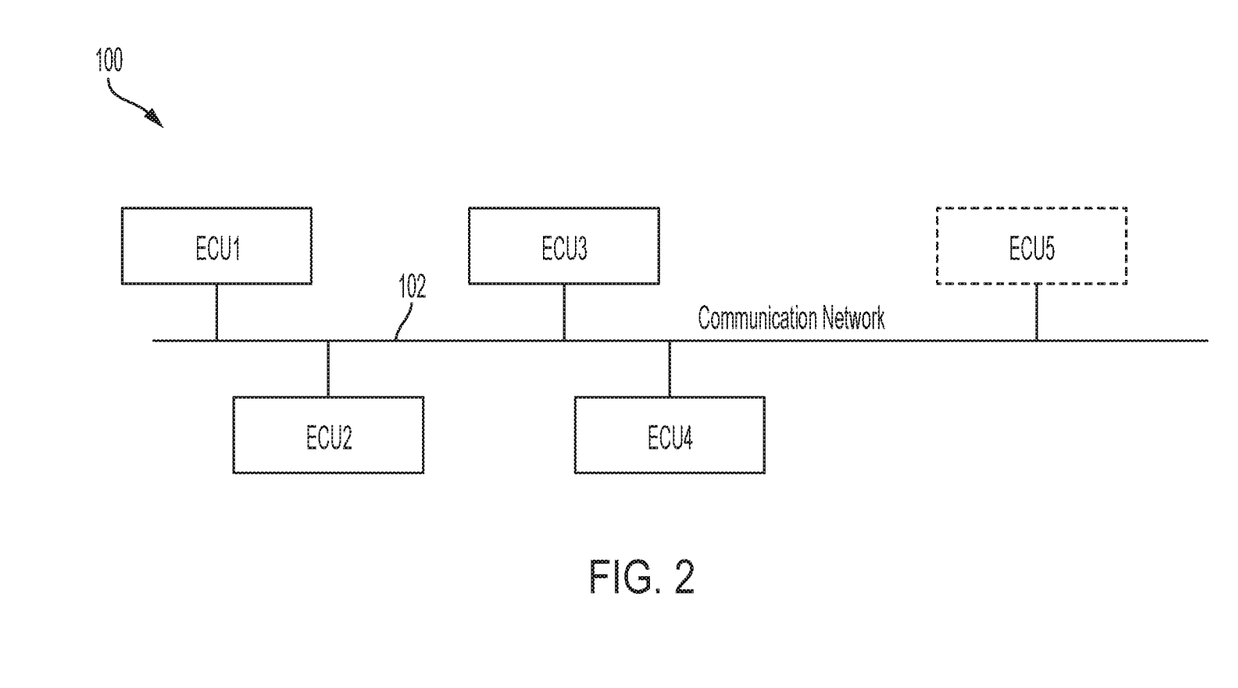
FIG. 2 generally illustrates a decentralized dynamic software throughput management system to the principles of the present disclosure.

The vehicle 10 may include a decentralized dynamic software throughput management system 100 as is generally illustrated in FIG. 2. As is generally illustrated in FIG. 2, the system 100 may include a network of electronic control units (ECU), such as ECU 1, ECU 2, ECU 3, ECU 4, and ECU 5. While only five ECUs are illustrated, the system 100 may include any suitable number of ECUs (e.g., 10s or 100s of ECUs) and/or other components than is generally illustrated and/or described herein.

Each of the ECUs may include a processor and memory that includes instructions that, when executed by the processor, cause the processor to, at least, perform various functions, including those described herein. In some embodiments, the each ECU includes a processor, and each processor communicates with associated memory. The ECU may include any suitable processor, such as those described herein. The memory may comprise a single disk or a plurality of disks (e.g., hard drives), and includes a storage management module that manages one or more partitions within the memory. In some embodiments, memory may include flash memory, semiconductor (solid state) memory or the like. The memory may include Random Access Memory (RAM), a Read-Only Memory (ROM), or a combination thereof.

The system 100 may include a communication network 102. The network 102 may include any suitable network, such as the Ethernet component 24, the CAN component 26, the MOST component 28, the FlexRay component 30, the LIN component 32, any other suitable network or other communication component, or a combination thereof. Each respective ECU of the system 100 may communicate with each other ECU and/or a subset of the other ECUs via the network 102. For example, the ECU 1 may be configured to perform braking operations for the vehicle 10. The ECU 1 may receive sensor data from various sensors of the vehicle 10 and may determine whether to actuate a brake of the vehicle 10. The ECU 2 may control, for example, braking mechanism of the vehicle 10. The ECU 1 may communicate with the ECU 2 to actuate the braking mechanism based on the sensor data received by the ECU 1.

Figure 4A:
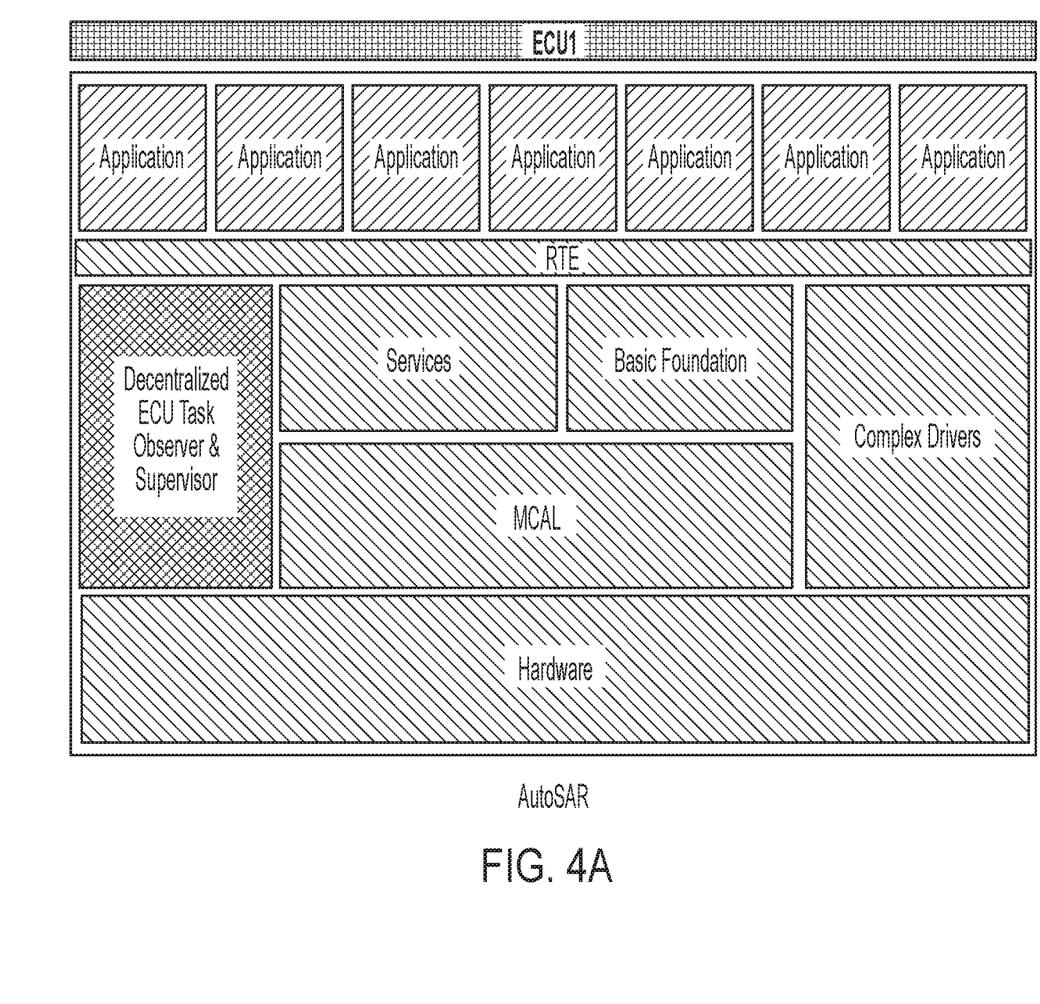
FIGS. 4A and 4B generally illustrate electronic control unit software architectures according to the principles of the present disclosure.
Figure 4B:
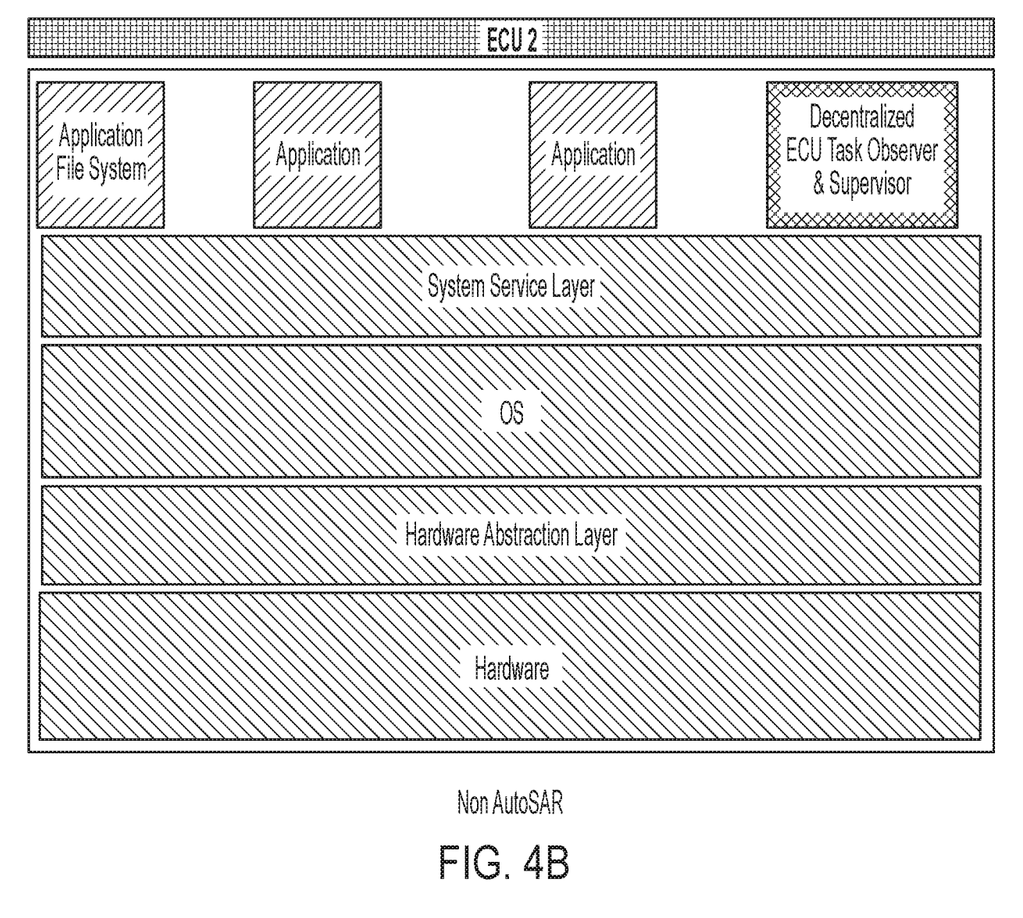

As is generally illustrated in FIGS. 4A and 4B, the ECU 1, or any other ECU of the system 100, may include an automotive system architecture (AutoSAR) that includes hardware, complex drivers, a microcontroller abstraction layer (MCAL), a basic foundation, various services, a decentralized ECU task observer and supervisor, a run-time environment (RTE), and application layer comprising various applications. In some embodiments, the ECU 2, or any other suitable ECU of the system 100, may include a non-AutoSAR architecture that includes hardware, a hardware abstraction layer, an operating system (OS), a system services layer, and an application layer comprising various applications including the decentralized ECU task observer and supervisor. In some embodiment, the ECU 3, or any other suitable ECU of the system 100, may include a non-AutoSAR without OS architecture that includes hardware, a hardware abstraction layer, and the decentralized ECU task observer and supervisor;

In some embodiments, the system 100 may improve throughput by offloading various software or tasks from one ECU to an ECU having idle time and that is capable of executing the software or tasks. For example, the ECU1 may represent a source ECU and may include software or tasks capable of being offloaded (e.g., referred to as a software stake) to other ECUs in order to take advantage of idle time of the other ECUs. The software stake may include software or tasks having limited input and output ranges, non-safety critical software or tasks, relatively small software or tasks, software or tasks using relatively simple math or minimum logical functions, software or tasks using basic functions, software or tasks having a finite loop, software or tasks using temporary (volatile) variables, other suitable software or tasks, or a combination thereof.

The system 100 may be configured to initiate the decentralized ECU task observer and supervisor application on at least a subset of ECUs in the network 102. The decentralized ECU task observer and supervisor application may include a software throughput management application and may be referred to herein as the management application.

Figure 3:
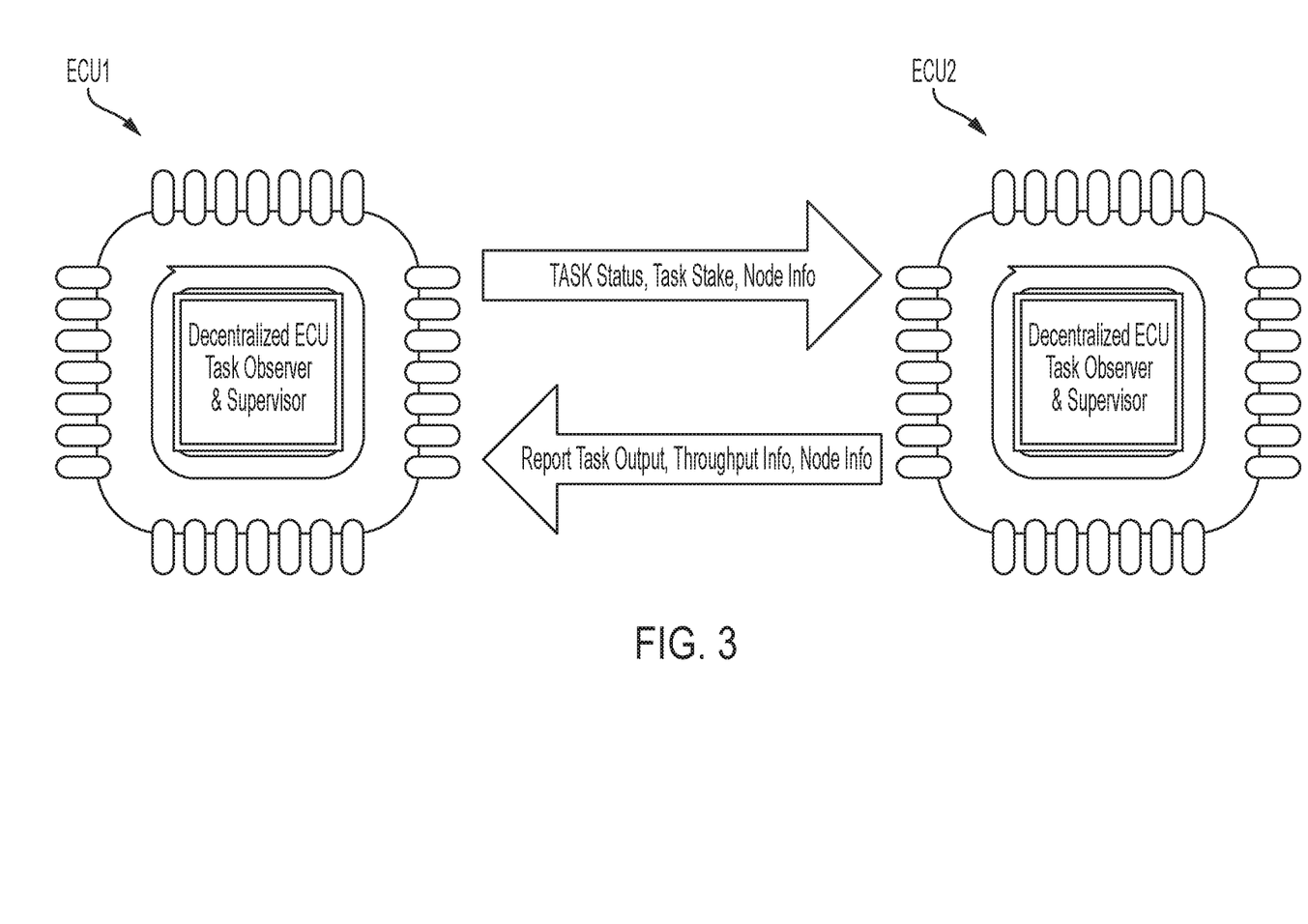
FIG. 3 generally illustrates communication between electronic control units according to the principles of the present disclosure.

As is generally illustrated in FIG. 3, an instance of the management application may reside on the ECU 1 and the ECU 2, and while not illustrated, an instance of the management application may also reside some or all of the other ECUs on the network 102. The ECU1, while executing the management application, may receive information from the other ECUs executing the management application on the network 102. The information may include, for each ECU executing the management application on the network 102, idle time, software stake information, proof of trust information, other suitable information, or a combination thereof.

The idle time may indicate an amount of available processing cycles for a respective ECU. The software stake information may indicate a software execution or task execution capability characteristic of a respective ECU. For example, the software stake information for a respective ECU may indicate whether the respective ECU is capable of executing the software stake that the ECU1 is offloading. The proof of trust information may indicate whether the respective ECU is trusted (e.g. as designated programmatically or selectively by the operator, programmer, or user of the system 100) to execute the software stake of the ECU1. The ECU1 may store, in memory, the information received from the other ECUs. For example, the ECU1 may update table stored in memory. The table may indicate the idle time, software stake information, proof of trust information, and/or other suitable information for each of the ECUs on the network 102.

The ECU1 may be configured to identify a remote (e.g., target) ECU to execute the software stake of the ECU1. For example, the ECU1 may identify a remote ECU, for example the ECU2, capable of executing the software stake from the table stored in memory. It should be understood that any ECU on the communication network 102 may be capable of being the remote ECU. The ECU1 may determine whether the ECU2 has sufficient idle time to execute the software stake based on the corresponding idle time of the ECU2 stored on the table. Additionally, or alternatively, the ECU1 may determine whether the ECU2 is trusted to execute the software stake based on the proof of trust information stored in the table.

If the ECU1 determines that the ECU2 is either incapable of executing the software stake or has insufficient idle time to execute the software stake, the ECU1 may identify another ECU as the remote or target ECU. Additionally, or alternatively, if the ECU1 determines that the ECU2 is not trusted to execute the software stake, the ECU1 may identify another ECU as the remote or target ECU. Conversely, if the ECU1 determines that the ECU2 is capable of executing the software stake, has sufficient idle time to execute the software stake, and is trusted to execute the software stake, the ECU1 generates a request (e.g., a signal indicating the request) to execute the software stake. The ECU1 communicates the request to the ECU2.

In response to receiving the request to execute the software stake, the ECU2 determines whether to accept the request. For example, the ECU2 may determine whether the ECU2 continues to have sufficient idle time to execute the software stake. If the ECU2 determines to accept the request to execute the software stake, the ECU2 generates an acceptable (e.g., a signal indicating the acceptance) and communicates the acceptance to the ECU1.

In response to receiving the acceptance from the ECU2, the ECU1 communicates the software associated with the software stake to the ECU2. The ECU2, in response to receiving the software with the software stake from the ECU1 flashes the software to the ECU2. The ECU2 may then execute the software associated with the software stake. The ECU2 may communicate data associated with the execution of the software to the ECU1. The data may include output of the execution of the software or other suitable data.

In some embodiments, the system 100 may perform the methods described herein. However, the methods described herein as performed by system 100 are not meant to be limiting, and any type of software executed on a controller can perform the methods described herein without departing from the scope of this disclosure. For example, a controller, such as a processor executing software within a computing device, can perform the methods described herein.

Figure 5:
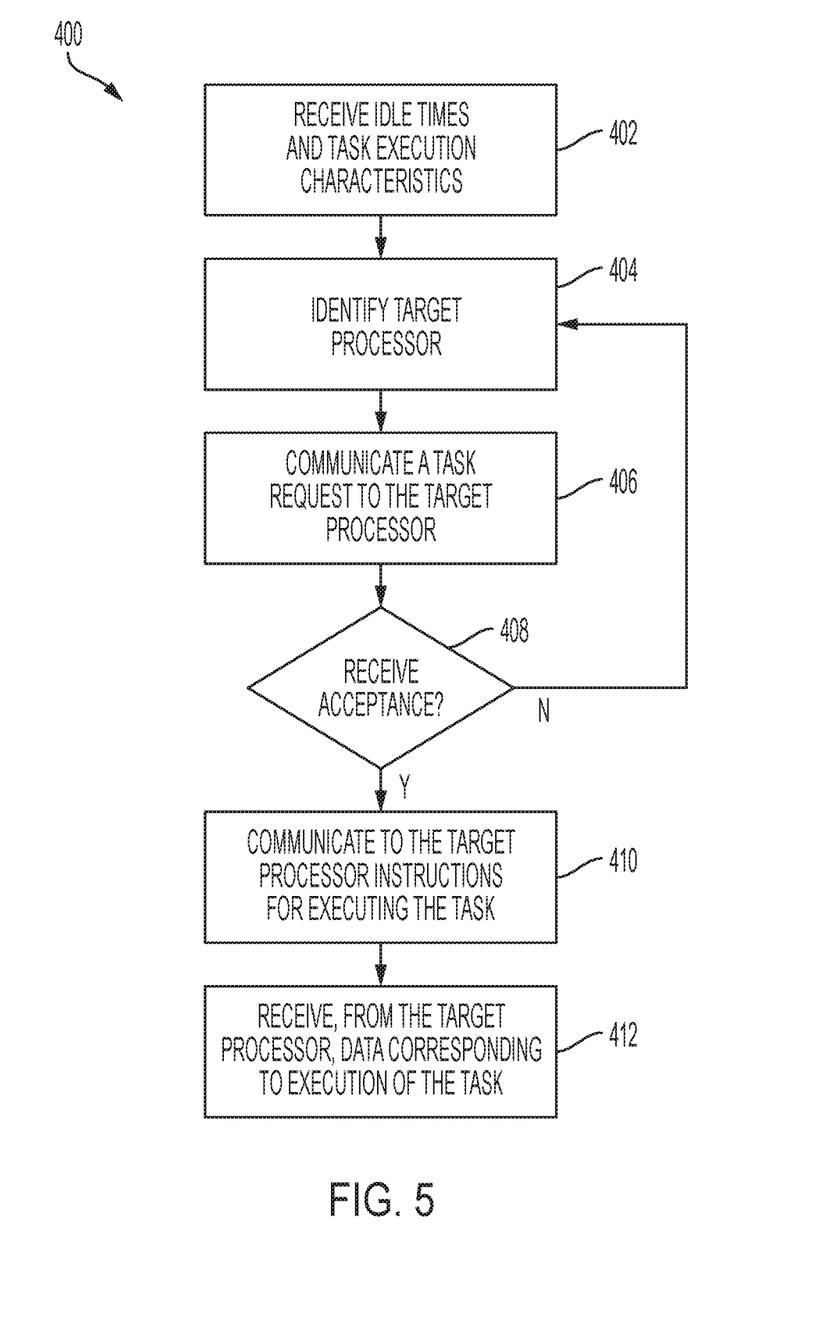
FIG. 5 is a flow diagram generally illustrating a decentralized dynamic software throughput management method according to the principles of the present disclosure.

FIG. 5 is a flow diagram generally illustrating a decentralized dynamic software throughput management method 400 according to the principles of the present disclosure. At 402, the method 400 receives idle times and task execution characteristics. For example, the ECU1 (e.g., or other suitable ECU) receives idle time information, software stake information (e.g., including software and/or task execution capability characteristics), and/or proof of trust information from the other ECUs on the communication network 102. The ECU1 may store the received idle time information, software stake information, and/or proof of trust information in the table in memory.

At 404, the method 400 identifies a target processor. For example, the ECU1 may identify a processor, such as the processor corresponding to ECU2 (herein after referred to as the ECU2) as the remote or target processor, based on the information stored in the table. At 406, the method 400 communicates a task request to the target processor. For example, the ECU1 generates and communicates a request to execute the software and/or task associate with the software stake to the ECU2.

At 408, the method 400 determines whether acceptance is received. For example, the ECU1 determines whether the ECU2 has communicated an acceptance (e.g. a signal indicating the acceptance) to execute (e.g., or perform) the software or task associated with the software stake. If the ECU1 determines that no acceptance as been received, the method 400 continue at 404. In some embodiments, the method 400 continues at 408 and waits for an acceptance. Alternatively, the method 400 ends if the method 400 receives an indication that the ECU2 as rejected the request. If the ECU1 determines that the acceptance is received (e.g., the ECU2 has accepted the request), the method 400 continues at 410.

At 410, the method 400 communicates to the target processor instructions for executing the task. For example, the ECU1 communicates instructions for executing the software or task associated with the software stake. In some embodiments, the instructions may include software configured to be flashed to the ECU2. In response to receiving the instructions, the ECU2 executes the software or task associated with the software stake.

At 412, the method 400 receives, from the target processor, data corresponding to the execution of the task. For example, the ECU1 receives, from the ECU2, data corresponding to the executing of the software or task associated with the software stake. In response to completing execution of the software or task associated with the software stake, the ECU2 communicates, to the ECU1, that the execution is complete. The ECU1 releases the ECU2.

In some embodiments, a system for dynamic software management includes a source processor and a memory. The memory includes instructions that, when executed by the source processor, cause the source processor to: receive, from one or more other processors, an idle time and at least one task execution characteristic of corresponding to each respective processor of the one or more other processors; identify a target processor of the one or more other processors capable of executing a task associated with the source processor based on the idle time and the at least one task execution characteristic of the target processor; communicate, to the target processor, a task request requesting the target processor execute the task associated with the source processor; and in response to receiving a communication from the target processor indicating acceptance of the task, communicate, to the target processor, instructions for executing the task.

In some embodiments, the at least one task execution characteristic indicates a capability of a respective processor of the one or more other processors of executing a particular task. In some embodiments, the instructions further cause the processor to store the idle time and the at least one task execution characteristic for each of the one or more other processors. In some embodiments, the target processor executes the task according to the instructions for executing the task. In some embodiments, the instructions further cause the processor to receive data, from the target processor, corresponding to execution of the task. In some embodiments, the instructions further cause the processor to receive, from each of the one or more other processors, a trust indication, the trust indication indicating that a respective processor of the one or more other processors is trusted to perform a corresponding task. In some embodiments, the task associated with the source processor includes a non-safety critical task. In some embodiments, the source processor and the one or more other processors are disposed in a vehicle.

In some embodiments, a method for dynamic software management includes receiving, at a source processor, an idle time and at least one task execution characteristic of corresponding to respective processors of one or more other processors. The method also includes identifying a target processor of the one or more other processors capable of executing a task associated with the source processor based on the idle time and the at least one task execution characteristic of the target processor. The method also includes communicating, to the target processor, a task request requesting the target processor execute the task associated with the source processor. The method also includes, in response to receiving a communication from the target processor indicating acceptance of the task, communicating, to the target processor, instructions for executing the task.

In some embodiments, the at least one task execution characteristic indicates a capability of a respective processor of the one or more other processors of executing a particular task. In some embodiments, the method also includes storing the idle time and the at least one task execution characteristic for each of the one or more other processors. In some embodiments, the target processor executes the task according to the instructions for executing the task. In some embodiments, the method also includes receiving data, from the target processor, corresponding to execution of the task. In some embodiments, the method also includes receiving, from each of the one or more other processors, a trust indication, the trust indication indicating that a respective processor of the one or more other processors is trusted to perform a corresponding task. In some embodiments, the task associated with the source processor includes a non-safety critical task. In some embodiments, the source processor and the one or more other processors are disposed in a vehicle.

In some embodiments, a dynamic software management apparatus includes a first electronic control unit of a vehicle. The first electronic control unit includes a processor and a memory. The memory includes instructions that, when executed by the processor, cause the processor to: receive, a second electronic control unit of the vehicle, an idle time and at least one task execution characteristic of the second electronic control unit; determine whether the second electronic control unit is capable of executing software associated with the first electronic control unit based on the idle time and the at least one task execution characteristic of the second electronic control unit; in response to a determination that the second electronic control unit is capable of executing the software, communicate, to the second electronic control unit, a request to execute the software; and in response to receiving a communication from the second electronic control unit indicating acceptance of the request to execute the software, flash the software on the second electronic control unit.

In some embodiments, the second electronic control unit executes the software. In some embodiments, the instructions further cause the processor to receive, from the second electronic control unit, data corresponding to execution of the software. In some embodiments, the software includes non-safety critical software.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation to encompass all such modifications and equivalent structure as is permitted under the law.

What is claimed is:

1. A system for dynamic software management, the system comprising:
 a source processor, wherein the source processor is associated with a steering system, and wherein the steering system includes one of an electronic power steering system and a steer-by-wire steering system; and
 a memory that includes instructions that, when executed by the source processor, cause the source processor to:
  receive, from one or more other processors, an idle time and at least one task execution characteristic corresponding to each respective processor of the one or more other processors, wherein the source processor and each of the one or more other processors are disposed on a controller area network within a vehicle, and wherein the source processor includes an automotive system architecture that includes at least a microcontroller abstraction layer and at least one of the one or more other processors includes a non-automotive system architecture that includes at least a hardware abstraction layer, wherein at least one of the one or more other processors is associated with a vehicle system other than the steering system, wherein the source processor executes an instance of a software throughput management application that includes a task observer and a supervisor function, wherein each of the processors of the one or more processors execute another instance of the software throughput management application configured to communicate with the instance of the software throughput management application executed by the source processor, and wherein the instance of the software throughput management application executed by the source processor is configured to communicate with the instances of the software throughput management application executed on each processor of the one or more processors to send or receive the idle time for each respective processor of the one or more processors and the at least one task execution characteristic of each respective processor of the one or more processors;
  store the idle time and the at least one task execution characteristic in the memory;
  identify a target processor of the one or more other processors capable of executing a task associated with the source processor based on the idle time and the at least one task execution characteristic of the target processor, wherein the idle time indicates an amount of available processing cycles of the target processor sufficient to execute the task associated with the source processor, and wherein the at least one task execution characteristic of the target processor includes proof of trust information indicating that the target processor is trusted by the source processor to execute the task associated with the source processor;
  communicate, to the target processor, a task request requesting the target processor execute the task associated with the source processor; and
  in response to receiving a communication from the target processor indicating acceptance of the task, communicate, to the target processor, instructions for executing the task, wherein the target processor executes the task according to the instructions for executing the task instead of the source processor executing the task.

2. The system of claim 1, wherein the at least one task execution characteristic indicates a capability of a respective processor of the one or more other processors of executing a particular task.

3. The system of claim 1, wherein the instructions further cause the source processor to receive data, from the target processor, corresponding to execution of the task.

4. The system of claim 1, wherein the at least one execution characteristic corresponding to each respective processor of the one or more other processors includes proof of trust information corresponding to each respective processor of the one or more other processors.

5. The system of claim 4, wherein the proof of trust information indicates that a respective processor of the one or more other processors is trusted to perform a corresponding task.

6. The system of claim 1, wherein the source processor includes an electronic control unit configured to control at least a portion of vehicle steering, and wherein the at least one of the one or more other processors are is capable of processing tasks associated with control of at least the portion of the vehicle steering.

7. A method for dynamic software management, the method comprising:
receiving, at a source processor, an idle time and at least one task execution characteristic of corresponding to respective processors of one or more other processors, wherein the source processor and each of the one or more other processors are disposed on a controller area network within a vehicle, and wherein the source processor includes an automotive system architecture that includes at least a microcontroller abstraction layer and at least one of the one or more other processors includes a non-automotive system architecture that includes at least a hardware abstraction layer, wherein the source processor is associated with a steering system and at least one of the one or more other processors is associated with a vehicle system other than the steering system, wherein the steering system includes one of an electronic power steering system and a steer-by-wire steering system, wherein the source processor executes an instance of a software throughput management application that includes a task observer and a supervisor function, wherein each of the processors of the one or more processors execute another instance of the software throughput management application configured to communicate with the instance of the software throughput management application executed by the source processor, and wherein the instance of the software throughput management application executed by the source processor is configured to communicate with the instances of the software throughput management application executed on each processor of the one or more processors to send or receive the idle time for each respective processor of the one or more processors and the at least one task execution characteristic of each respective processor of the one or more processors;
storing the idle time and the at least one task execution characteristic in a memory;
identifying a target processor of the one or more other processors capable of executing a task associated with the source processor based on the idle time and the at least one task execution characteristic of the target processor, wherein the idle time indicates an amount of available processing cycles of the target processor sufficient to execute the task associated with the source processor, and wherein the at least one task execution characteristic of the target processor includes proof of trust information indicating that the target processor is trusted by the source processor to execute the task associated with the source processor;
communicating, to the target processor, a task request requesting the target processor execute the task associated with the source processor; and
in response to receiving a communication from the target processor indicating acceptance of the task, communicating, to the target processor, instructions for executing the task, wherein the target processor executes the task according to the instructions for executing the task instead of the source processor executing the task.

8. The method of claim 7, wherein the at least one task execution characteristic indicates a capability of a respective processor of the one or more other processors of executing a particular task.

9. The method of claim 7, further comprising receiving data, from the target processor, corresponding to execution of the task.

10. The method of claim 7, wherein the at least one task execution characteristic corresponding to each respective processor of the one or more other processors includes trust information corresponding to each respective process of the one or more other processors.

11. The method of claim 10, wherein the proof of trust information indicates that a respective processor of the one or more other processors is trusted to perform a corresponding task.

12. A dynamic software management apparatus, comprising:
a first electronic control unit of a vehicle, the first electronic control unit including a processor and a memory, the memory including instructions that, when executed by the processor, cause the processor to:
receive, from a second electronic control unit of the vehicle, an idle time and at least one task execution characteristic of the second electronic control unit, wherein the first electronic control unit includes an automotive system architecture that includes at least a microcontroller abstraction layer and the second electronic control unit includes a non-automotive system architecture that includes at least a hardware abstraction layer, and wherein the first electronic control unit and the second electronic control unit are disposed on a controller area network of the vehicle, wherein the first electronic control unit is associated with a steering system and the second electronic control unit is associated with a vehicle system other than the steering system, wherein the steering system includes one of an electronic power steering system and a steer-by-wire steering system, wherein the first electronic control unit executes an instance of a software throughput management application that includes a task observer and a supervisor function, wherein the second electronic control unit executes another instance of the software throughput management application configured to communicate with the instance of the software throughput management application executed by the first electronic control unit, and wherein the instance of the software throughput management application executed by the first electronic control unit is configured to communicate with the instance of the software throughput management application executed on the second electronic control unit to send or receive the idle time and the at least one task execution characteristic of the second electronic control unit;
store the idle time and the at least one task execution characteristic in the memory;
determine whether the second electronic control unit is capable of executing software associated with the first electronic control unit based on the idle time and the at least one task execution characteristic of the second electronic control unit, wherein the idle time indicates an amount of available processing cycles of the second electronic control unit sufficient to execute the task associated with the first electronic control unit, and wherein the at least one task execution characteristic of the second electronic control unit includes proof of trust information indicating that the second electronic control unit is trusted by the first electronic control unit to execute the task associated with the first electronic control unit;

in response to a determination that the second electronic control unit is capable of executing the software, communicate, to the second electronic control unit, a request to execute the software; and in response to receiving a communication from the second electronic control unit indicating acceptance of the request to execute the software, flash the software on the second electronic control unit, wherein the second electronic control unit executes the software instead of the first electronic control unit.

13. The dynamic software management apparatus of claim 12, wherein the instructions further cause the processor to receive, from the second electronic control unit, data corresponding to execution of the software.

14. The dynamic software management apparatus of claim 12, wherein the at least one task execution characteristic indicates a capability of a respective processor of the one or more other processors of executing a particular task.

* * * * *